(12) United States Patent
Weber et al.

(10) Patent No.: US 8,751,101 B2
(45) Date of Patent: Jun. 10, 2014

(54) DIAGNOSING A COOLING SUBSYSTEM OF AN ENGINE SYSTEM IN RESPONSE TO DYNAMIC PRESSURE SENSED IN THE SUBSYSTEM

(75) Inventors: Olaf Weber, Bloomfield Hills, MI (US); Wolfgang Wenzel, Stuttgart (DE)

(73) Assignee: BorgWarner Inc., Auburn Hills, MI (US)

(*) Notice: Subject to any disclaimer, the term of this patent is extended or adjusted under 35 U.S.C. 154(b) by 600 days.

(21) Appl. No.: 13/003,377

(22) PCT Filed: Jul. 7, 2009

(86) PCT No.: PCT/US2009/049740
§ 371 (c)(1),
(2), (4) Date: Jan. 10, 2011

(87) PCT Pub. No.: WO2010/008961
PCT Pub. Date: Jan. 21, 2010

(65) Prior Publication Data
US 2011/0125361 A1    May 26, 2011

Related U.S. Application Data

(60) Provisional application No. 61/081,160, filed on Jul. 16, 2008.

(51) Int. Cl.
*F01P 9/06* (2006.01)
(52) U.S. Cl.
USPC ....... 701/34.4; 701/29.1; 701/31.7; 701/31.8; 123/568.12; 123/568.2; 73/1.66; 702/50

(58) Field of Classification Search
USPC .................... 701/29.1, 31.7, 31.8, 34.4, 101; 123/568.12, 568.2; 73/1.66; 702/50, 51
See application file for complete search history.

(56) References Cited

U.S. PATENT DOCUMENTS

| | | | | |
|---|---|---|---|---|
| 6,044,808 | A * | 4/2000 | Hollis | 123/41.1 |
| 6,164,270 | A * | 12/2000 | Bidner et al. | 123/568.16 |
| 6,244,256 | B1 * | 6/2001 | Wall et al. | 123/568.12 |
| 7,069,883 | B2 * | 7/2006 | Atkins | 123/41.81 |
| 7,195,006 | B2 * | 3/2007 | Khair et al. | 123/568.12 |
| 7,261,086 | B2 * | 8/2007 | Nuang | 123/436 |
| 7,389,771 | B2 * | 6/2008 | Andrews et al. | 123/568.22 |
| 7,461,641 | B1 * | 12/2008 | Styles et al. | 123/568.12 |
| 7,673,591 | B2 * | 3/2010 | Vuk | 123/41.02 |
| 7,874,154 | B2 * | 1/2011 | Raab et al. | 60/599 |
| 2004/0216701 | A1 * | 11/2004 | Hutchins | 123/41.08 |
| 2006/0137665 | A1 * | 6/2006 | Khair et al. | 123/568.12 |
| 2006/0213461 | A1 * | 9/2006 | Hayami | 123/41.15 |
| 2007/0000482 | A1 * | 1/2007 | Tamura et al. | 123/687 |
| 2008/0053418 | A1 * | 3/2008 | Andrews et al. | 123/568.22 |
| 2008/0264609 | A1 * | 10/2008 | Lutz et al. | 165/104.19 |
| 2009/0078220 | A1 * | 3/2009 | Meyer et al. | 123/41.31 |
| 2009/0301409 | A1 * | 12/2009 | Dahl et al. | 123/41.1 |

* cited by examiner

*Primary Examiner* — Thomas Black
*Assistant Examiner* — Peter D Nolan

(57) ABSTRACT

A method of diagnosing a cooling subsystem of an engine system in response a parameter extracted from dynamic hydraulic pressure sensed in the cooling subsystem, and products and systems using same.

31 Claims, 3 Drawing Sheets

DIAGNOSING A COOLING SUBSYSTEM OF AN ENGINE SYSTEM IN RESPONSE TO DYNAMIC PRESSURE SENSED IN THE SUBSYSTEM

This application claims the benefit of U.S. Provisional Application No. 61/081,160 filed Jul. 16, 2008.

TECHNICAL FIELD

The field to which the disclosure generally relates includes internal combustion engine systems and, more particularly, indicating conditions of or amount of coolant in engine cooling subsystems.

BACKGROUND

An internal combustion engine system is typically equipped with a cooling subsystem that basically circulates liquid coolant between coolant passages in an engine and a heat exchanger located remotely from the engine. The coolant absorbs heat produced by the engine and is carried to the heat exchanger, which dissipates the heat from the coolant into the air. A conventional cooling subsystem also typically includes one or more pumps, filters, thermostats and other valves, and conduit interconnecting such devices. Conventional cooling subsystems also usually include static temperature sensors that monitor static coolant temperature to diagnose thermostat valve failures.

SUMMARY OF EXEMPLARY EMBODIMENTS OF THE INVENTION

One exemplary embodiment of the invention may include a method comprising sensing dynamic hydraulic pressure in a cooling subsystem of an engine system, extracting a parameter from the sensed dynamic hydraulic pressure, and evaluating the extracted parameter to diagnose a condition of the cooling subsystem.

Another exemplary embodiment of the invention may include an engine system comprising an engine, a cooling subsystem coupled to the engine to cool at least a portion of the engine and including a hydraulic pressure sensor to sense dynamic hydraulic pressure in the cooling subsystem, and a control subsystem to extract a parameter from the sensed dynamic hydraulic pressure, and to evaluate the extracted parameter to diagnose a condition of the cooling subsystem.

A further exemplary embodiment of the invention may include an engine system comprising an internal combustion engine, and an engine breathing system coupled to the engine. The breathing system includes an induction subsystem coupled to the engine, an exhaust subsystem coupled to the engine, and a high-pressure (HP) exhaust gas recirculation (EGR) subsystem in communication across the exhaust and induction subsystems, and including a HP high-temperature (HT) EGR cooler. The breathing system also includes a turbocharger between the induction and exhaust subsystems and having a turbine in the exhaust subsystem and a compressor in the induction subsystem. The breathing system further includes a low-pressure (LP) EGR subsystem in communication across the exhaust subsystem downstream of the turbine and upstream of the compressor, and including a LP HT EGR cooler. The engine system also comprises a cooling subsystem coupled to the engine to cool at least a portion of the engine, and including a plurality of hydraulic pressure sensing devices to sense dynamic hydraulic pressure, and a high-temperature (HT) cooling subsystem in fluid communication with the internal combustion engine and the engine breathing system, and including an HT radiator, an HT coolant pump, a thermostat valve, the HP and LP HT EGR coolers, an HT coolant valve. A control subsystem extracts a parameter from the sensed dynamic hydraulic pressure, and to evaluate the extracted parameter to diagnose a condition of the cooling subsystem.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the exemplary embodiment(s) is merely exemplary in nature and is in no way intended to limit the invention, its application, or uses.

Figure 1:
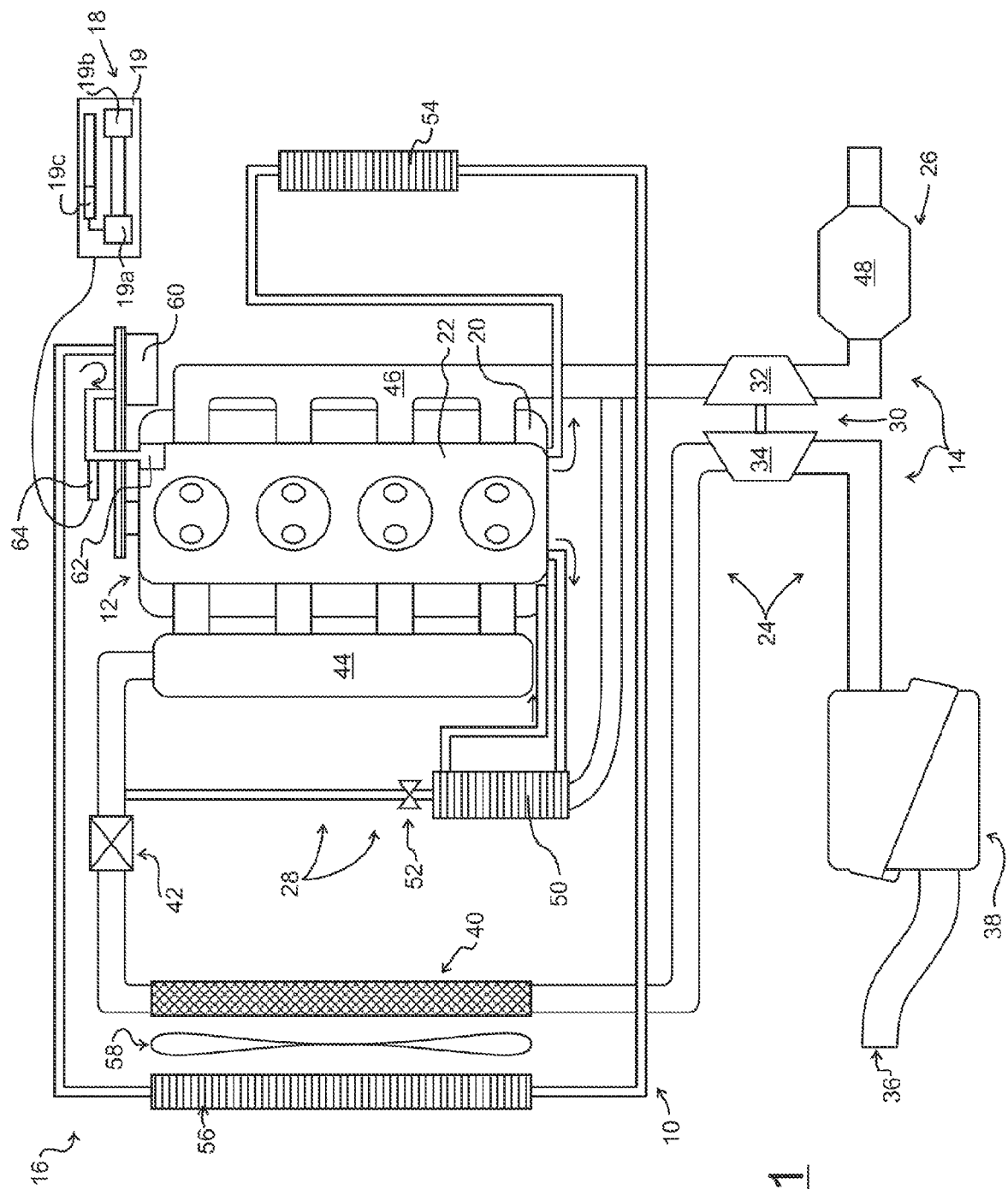
FIG. 1 is a schematic view of an exemplary embodiment of a portion of an engine system including an engine and an engine cooling subsystem.
Figure 2:
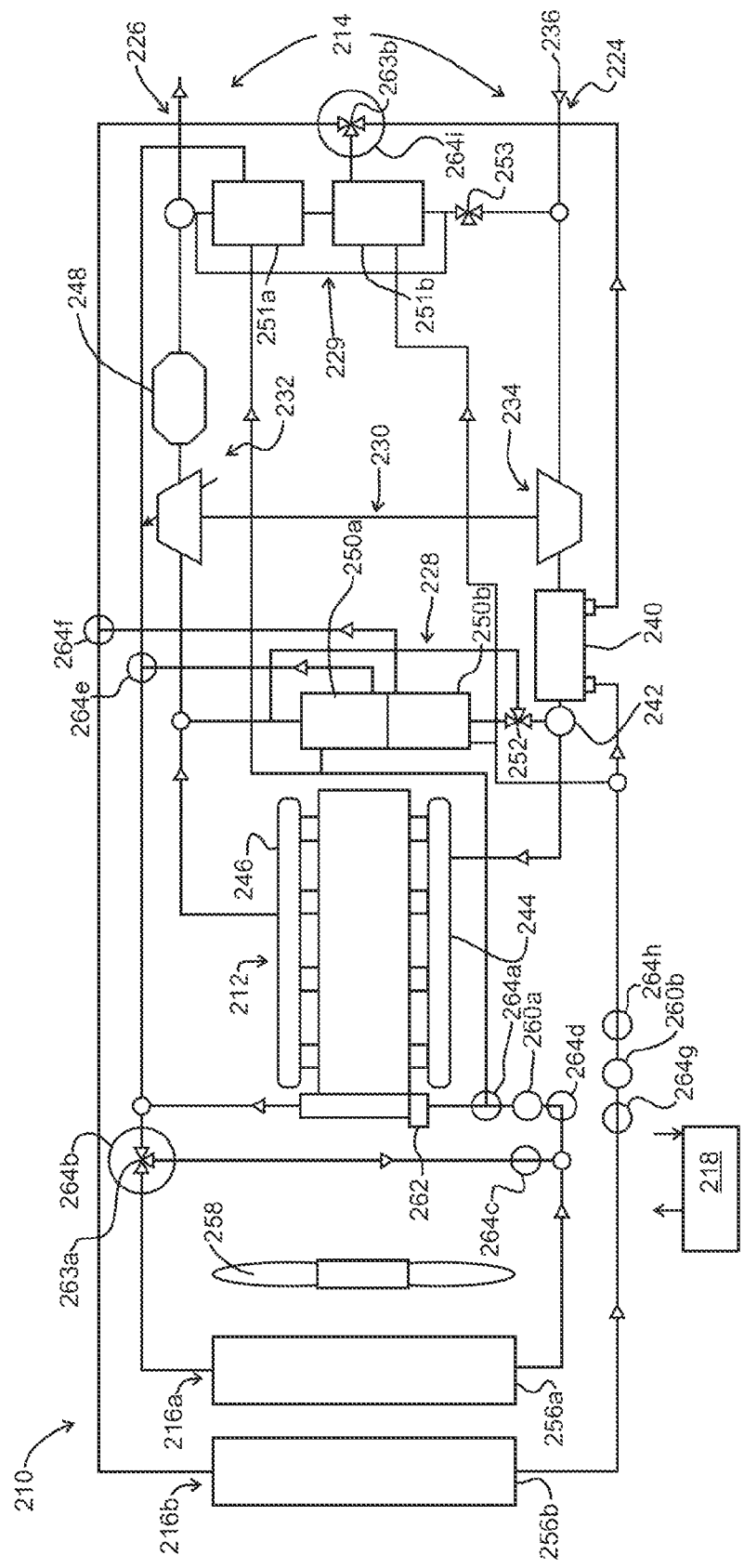
FIG. 2 is a schematic view of another exemplary embodiment of a portion of an engine system including an engine and an engine cooling subsystem.

Exemplary operating environments are illustrated in FIGS. 1 and 2 and may be used to implement a presently disclosed method of diagnosing a cooling subsystem of an engine system in response to dynamic hydraulic pressure sensed in the subsystem. The method may be carried out using any suitable system and, more specifically, may be carried out in conjunction with an engine system such as system 10 or 210 of FIG. 1 or 2. The following system descriptions simply provide a brief overview of two exemplary engine systems, but other systems and components not shown here could also support the presently disclosed method.

In general, and referring to FIG. 1, the system 10 may include an internal combustion engine 12 that may combust a mixture of fuel and induction gases for conversion into mechanical rotational energy and exhaust gases, an engine breathing system 14 that may deliver induction gases to the engine 12 and carry exhaust gases away from the engine 12. The system 10 may also include a fuel subsystem (not shown) to provide any suitable liquid and/or gaseous fuel to the engine 12 for combustion therein with the induction gases, a cooling subsystem 16 for cooling the engine 12 and/or the breathing system 14, and a control subsystem 18 to control operation of at least a portion of the engine system 10.

The internal combustion engine 12 may be any suitable type of engine, such as a spark-ignition engine like a gasoline engine, an autoignition or compression-ignition engine like a diesel engine, or the like. The engine 12 may include a block 20 with cylinders and pistons therein (not separately shown), which, along with a cylinder head 22 may define combustion chambers for internal combustion of a mixture of fuel and induction gases. The engine 12 may include any quantity of cylinders, and may be of any size and may operate according to any suitable speeds and loads.

The engine breathing system 14 may include an induction subsystem 24 that may compress and cool induction gases and convey them to the engine 12 and an exhaust subsystem 26 that may extract energy from exhaust gases and carry them away from the engine 12. The engine breathing system 14 may also include an exhaust gas recirculation (EGR) subsystem 28 in communication across the exhaust and induction subsystems 24, 26 to recirculate exhaust gases for mixture with fresh air to reduce emissions and pumping losses from the engine system 10.

The engine breathing system 14 may further include a turbocharger 30 of any type, located between the induction and exhaust 24, 26 subsystems to compress inlet air and thereby improve combustion to increase engine power output. As used herein, the phrase induction gases may include fresh air, compressed air, and/or recirculated exhaust gases. The turbocharging subsystem 30 may be a single stage system as shown, or may be a multi-stage or sequential turbocharging subsystem. The turbocharging subsystem 30 may include a turbine 32 in the exhaust subsystem 26, and a compressor 34 in the induction subsystem 24 mechanically coupled to and driven by the turbine 32. In another embodiment, the compressor 34 may be any suitable mechanical or electromechanical compressor driven in any suitable manner and need not be driven by the turbine 32. In other words, a stand-alone compressor may be used to compress inlet air and thereby improve combustion to increase engine power output.

The induction subsystem 24 may include, in addition to suitable conduit and connectors, an inlet end 36 which may have an air filter 38 to filter incoming air, and the turbocharger compressor 34 downstream of the inlet end 36 to compress the inlet air. The induction subsystem 24 may also include a charge air cooler 40 downstream of the turbocharger compressor 34 to cool the compressed air, and an intake throttle valve 42 downstream of the charge air cooler 40 to throttle the flow of the cooled air to the engine 12. The induction subsystem 24 also may include an intake manifold 44 downstream of the throttle valve 42 and upstream of the engine 12, to receive the throttled air and distribute it to the engine combustion chambers. The induction subsystem 24 may also include any other suitable devices of any kind.

The exhaust subsystem 26 may include, in addition to suitable conduit and connectors, an exhaust manifold 46 to collect exhaust gases from the combustion chambers of the engine 12 and convey them downstream to the rest of the exhaust subsystem 26. The exhaust subsystem 26 also may include the turbocharger turbine 32 in downstream communication with the exhaust manifold 46. The exhaust subsystem 26 may also include any quantity of suitable emissions devices 48 anywhere downstream of the exhaust manifold 46.

The EGR subsystem 28 may recirculate portions of the exhaust gases from the exhaust subsystem 26 to the induction subsystem 24 for combustion in the engine 12, and may be a single path EGR subsystem as shown, or may be a hybrid or dual path EGR subsystem As shown, the EGR subsystem 28 may include a high pressure (HP) EGR path connected to the exhaust subsystem 26 upstream of the turbocharger turbine 32 but connected to the induction subsystem 24 downstream of the turbocharger compressor 34. The EGR subsystem 28 may include, in addition to suitable conduit and connectors, an EGR cooler 50 and an EGR valve 52, which may be located upstream or downstream of the EGR cooler 50, to apportion EGR flow between the exhaust and induction subsystems 26, 24.

The cooling subsystem 16 may include any suitable device(s) in any quantities that may be connected by any appropriate conduit that may include hoses, piping, tubing, passageways, or the like. A heater core 54 may be used to absorb heat from hot coolant exiting the engine 12, such as the cylinder head 22, and dissipate the heat, for example, into a passenger compartment (not shown) of an automobile carrying the engine 12. Also, any suitable heat exchanging device, such as a radiator 56 with or without a fan 58, may be used to exchange heat of the coolant with another medium such as air. Further, a pump 60 may be used to draw coolant out of one portion of the engine 12 such as the cylinder head 22 and deliver it back to another portion of the engine 12 such as the cylinder block 20. The pump 60 may be mechanically driven, for example, by an engine crankshaft and belt as shown, or may be an electric pump powered in any suitable manner. Additionally, a thermostat valve 62 may be used to regulate flow of coolant through the cooling subsystem 16. Moreover, the EGR cooler 50 may be used to absorb heat from hot exhaust gases and dissipate the heat into engine coolant received, for example, from the engine 12 such as from the cylinder head 22 and delivered to another portion of the engine 12 such as the cylinder block 20.

The cooling subsystem 16 also includes one or more devices 64 to sense hydraulic pressure at one or more locations of the cooling subsystem 16. For example, the sensing devices 64 may include one or more hydraulic pressure sensors in fluid communication with the coolant and/or hydrophones in fluid communication with the coolant or carried in any suitable location on the conduit or other components or devices. The sensing devices 64 may sense the actual physical parameter of hydraulic pressure, from which other pressure-related parameters and values may be derived or otherwise extracted by the devices 64 or by downstream signal processing devices such as in the control subsystem 18.

As used herein, the terminology hydraulic pressure includes actual fluid pressure and/or sound pressure corresponding to actual fluid pressure. Unlike static hydraulic pressure sensors that simply provide a discrete or instantaneous pressure output signal; dynamic hydraulic pressure sensors measure hydraulic pressure waves over a period of time and provide corresponding dynamic output signals. Further as used herein, the term dynamic pressure measurements may include, as an example, those taken from 10 Hz up to an exemplary high of 10 kHz, for example, to measure pump cavitation.

Any suitable hydraulic pressure sensors may be used, for example, piezoelectric sensors such as hydrophones or the like. Hydrophones may measure sound pressure and sound pressure variations in space and time. A hydrophone may include an acousto-electrical transducer, which may convert alternating sound pressure acting on the hydrophone into a proportional alternating voltage. One type of hydrophone includes a needle-type hydrophone that may be equipped with a transducer element composed of piezo-ceramic or piezo-foil glued on a point of a needle. Another type of hydrophone includes a membrane-type hydrophone, which may include a piezo-foil carried on a frame.

The control subsystem 18 may include, for example, a vehicle controller, engine system controller, cooling system controller, and/or the sensing device(s) 64. The control subsystem 18 may include any suitable hardware, software, and/or firmware to carry out at least some portions of the methods disclosed herein below. For example, the control subsystem 18 may include various engine system actuators and sensors (not shown). The engine system sensors are not individually shown in the drawings but may include any suitable devices to monitor engine system parameters.

The control subsystem 18 may further include one or more controllers 19 in communication with the actuators and sensors for receiving and processing sensor input and transmitting actuator output signals. The controller(s) 19 may include one or more suitable processors 19a, memory 19b, and one or more interfaces 19c coupling the controller(s) 19 to one or more other devices. The processor(s) 19a may execute instructions that provide at least some of the functionality for the system 10. As used herein, the term instructions may include, for example, control logic, computer software and/or firmware, programmable instructions, or other suitable instructions. The processor may include, for example, one or more microprocessors, microcontrollers, application specific integrated circuits, and/or any other suitable type of processing device. Also, the memory 19b may be configured to provide storage for data received by or loaded to the system 10, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage device. Finally, the interfaces 19c may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the controller 19 in communicating with other devices.

FIG. 2 illustrates another exemplary embodiment of an engine system 210. This embodiment is similar in many respects to the embodiment of FIG. 1 and like numerals between the embodiments generally designate like or corresponding elements throughout the several views of the drawing figures. Additionally, the descriptions of the embodiments are incorporated by reference into one another and the common subject matter generally may not be repeated here.

The engine system 210 may include an internal combustion engine 212, an engine breathing system 214, a high-temperature (HT) cooling subsystem 216a, a low-temperature (LT) cooling subsystem 210, and a control subsystem 218. As used herein, high-temperature and low-temperature are relative terms and may include any suitable temperature ranges for cooling subsystems known to those of ordinary skill in the art.

The engine breathing system 214 may include an induction subsystem 224 and an exhaust subsystem 226. The engine breathing system 214 may also include a first or high-pressure (HP) exhaust gas recirculation (EGR) subsystem 228 in communication across the exhaust and induction subsystems 224, 226. The engine breathing system 214 may further include a turbocharger 230 of any type located between the induction and exhaust 224, 226 subsystems and including a turbine 232 in the exhaust subsystem 226 and a compressor 234 in the induction subsystem 224. The engine breathing system 214 additionally may include a second or low-pressure (LP) EGR subsystem 229 in communication across the exhaust subsystem 224 downstream of the turbine 232 and upstream of the compressor 234.

The induction subsystem 224 may include an inlet end 236, the turbocharger compressor 234, a charge air cooler (CAC) 240 downstream of the compressor 234, an intake throttle valve 242, and an intake manifold 244. The exhaust subsystem 226 may include an exhaust manifold 246, the turbocharger turbine 232, and an emissions device 248. The HP EGR subsystem 228 may include a first or HT EGR cooler 250a, a second or LT EGR cooler 250b, and an EGR valve 252. Similarly, the LP EGR subsystem 229 may include a first or HT EGR cooler 251a, a second or LT EGR cooler 251b, and an EGR valve 253. In one embodiment, the LT cooling subsystem 216b may use indirect charge air cooling, for example, wherein the CAC 240 may include a coolant-to-gas type of CAC.

The HT cooling subsystem 216a may include a radiator 256a with or without a fan 258, a first or HT coolant pump 260a, a thermostat valve 262, the first and second HT EGR coolers 250a, 251a, and a first or HT coolant valve 263a. The LT cooling subsystem 216b may include a radiator 256b with or without the fan 258, a second or LT coolant pump 260b, the first and second LT EGR coolers 250b, 251b, and a second or LT coolant valve 263b.

The HT and LT cooling subsystems 216a, 216b also include one or more devices 264a-264i to sense hydraulic pressure at one or more locations in the cooling subsystems 216a, 216b. Where multiple sensing devices are used, they may sense hydraulic pressure in different locations to output signals that may be evaluated to determine a coolant pressure differential between the locations. The sensing devices 264a-264i may be part of and/or coupled to the control subsystem 218 (interconnections not shown).

In a first example and referring to the HT cooling subsystem 216a, a first sensing device 264a may be placed in any suitable location downstream of the HT coolant pump 260a and upstream of the engine 212. In a more particular instance of this example, the device 264a may be placed just upstream downstream, or at a junction between the pump and the thermostat valve and including a branch supplying coolant to the HT EGR coolers 250a, 251a. As used herein, the terminology just upstream or just downstream includes such proximity to some device or component sufficient to monitor and/or diagnose that device or component. In this example, the device 264a may be used to monitor and diagnose operation of the pump 260a, the thermostat 262, and/or coolant flow to the HT EGR coolers 250a, 251a.

In a second example, a second sensing device 264b may be placed in any suitable location downstream of the engine 212 and upstream of the HT radiator 256a. In a more particular instance of this example, the device 264b may be placed just upstream, downstream, or at the HT coolant valve 263a, to monitor and diagnose operation of the HT coolant valve 263a.

In a third example, a third sensing device 264c may be placed in any suitable location downstream of the engine 212 and upstream of the HT pump 260a. In a more particular instance of this example, the device 264c may be placed in a bypass branch in parallel across the HT radiator 256a to monitor and diagnose coolant flow through the bypass branch.

In a fourth example, a fourth sensing device 264d may be placed in any suitable location downstream of the engine 212 and upstream of the HT pump 260a. In a more particular instance of this example, the device 264d may be placed just upstream of the HT pump 260a to monitor and diagnose operation of the pump 260a.

In a fifth example, a fifth sensing device 264e may be placed in any suitable location downstream of the HT EGR cooler 250a and upstream of the HT pump 260a. In a more particular instance of this example, the device 264e may be placed just upstream, downstream, or at a junction of HP and LP HT coolant branches to monitor and diagnose flow of coolant downstream of the HT EGR coolers 250a, 251a.

Similarly, in a sixth example and referring to the LT cooling subsystem 216b, a sixth sensing device 264f may be placed in any suitable location downstream of the LT EGR cooler 250b and upstream of the LT radiator 256b. In a more particular instance of this example, the device 264f may be placed just upstream, downstream, or at a junction of HP and LP LT coolant branches to monitor and diagnose flow of coolant downstream of the LT EGR coolers 250b, 251b.

In a seventh example. a seventh sensing device 264g may be placed in any suitable location downstream of the LT radiator 256b and upstream of the LT pump 260b. In a more particular instance of this example, the device 264g may be placed just upstream of the LT pump 260b to monitor and diagnose operation of the pump 260b.

In an eighth example, an eighth sensing device 264h may be placed in any suitable location downstream of the LT pump 260b and upstream of the CAC 240. In a more particular instance of this example, the device 264h may be placed just downstream of the LT pump 260b to monitor and diagnose operation of the pump 260b.

In a ninth example, a ninth sensing device 264i may be placed in any suitable location downstream of both the CAC 240 and the LP HT EGR cooler 251b, and upstream of the LT radiator 256b. In a more particular instance of this example, the device 264i may be placed just upstream. downstream, or at the LT coolant valve 2631), to monitor and diagnose operation of the LT coolant valve 263b.

Figure 3:
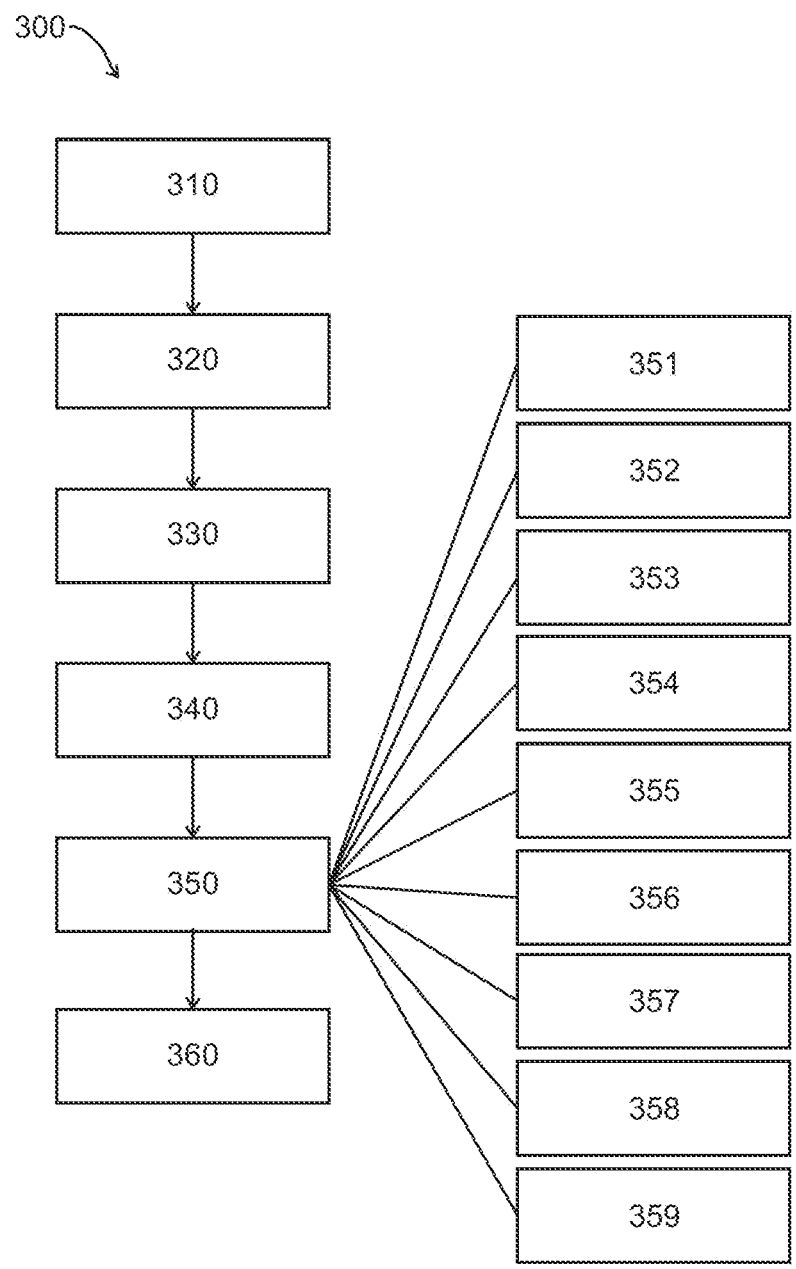
FIG. 3 is a flowchart of an exemplary embodiment of a method of diagnosing a cooling subsystem of an engine system in response to dynamic hydraulic pressure sensed in the cooling subsystem.

One embodiment of the invention may include an exemplary method of diagnosing a cooling subsystem of an engine system in response to dynamic hydraulic pressure sensed in the cooling subsystem. The method may be at least partially carried out as one or more computer programs usable, for example, within the operating environment of one or both of the exemplary engine systems 10, 210 described above. Those skilled in the art will also recognize that a method according to any number of embodiments of the invention may be carried out using other engine systems within other operating environments. Referring now to FIG. 3, an exemplary method 300 is illustrated in flow chart form. As the description of the method 300 progresses, reference will be made to the engine system 10, 210 of FIG. 1 or 2.

As shown at step 310, the method 300 may be initiated in any suitable manner. For example, the method 300 may be initiated at startup of the engine 12 of the engine system 10 of FIG. 1.

At step 320, one or more engine system parameters may be monitored, and may be used as input that may be processed in diagnosing a cooling subsystem. For example, engine speed may be sensed by one or more shaft position sensors or speed sensors, or coolant temperature may be sensed by one or more temperature or thermostat sensors.

Other sensors and related parameters may be used, for example, pressure sensors in communication with engine combustion chambers may measure engine cylinder pressure. intake and exhaust manifold pressure sensors may measure pressure of gases flowing into and away from the combustion chambers, an inlet air mass flow sensor may measure incoming airflow in the induction subsystem, and/or an intake manifold mass flow sensor may measure flow of induction gases to the engine. Still other sensors and related parameters may include temperature sensors to measure the temperature of induction gases flowing to the engine, a speed sensor suitably coupled to the turbocharger to measure the rotational speed thereof, a throttle position sensor, a variable turbine geometry (VTG) position sensor, a tailpipe temperature sensor, temperature or pressure sensors placed upstream and downstream of emissions device(s), and/or oxygen ($O_2$) sensors placed in the exhaust and/or induction subsystems, position sensors to measure positions of any valves.

In addition to the sensors discussed herein, any other suitable sensors and their associated parameters may be encompassed by the presently disclosed system and methods. For example, the sensors may also include accelerator sensors, vehicle speed sensors, powertrain speed sensors, filter sensors, other flow sensors, vibration sensors, knock sensors, intake and exhaust pressure sensors, and/or the like. In other words, any sensors may be used to sense any suitable physical parameters including electrical, mechanical, and chemical parameters. As used herein, the term sensor may include any suitable hardware and/or software used to sense any engine system parameter and/or various combinations of such parameters.

At step 330, hydraulic pressure of a cooling subsystem of an engine system may be sensed. For example, dynamic hydraulic pressure may be sensed using any suitable sensing apparatus, including the sensing device(s) 64, 264a-i, placed in any suitable location(s) of the cooling subsystem 16. The sensing device(s) 64, 264a-i may sense coolant pressure in components or devices of the cooling subsystem 16, 216a,b. The pressure readings may be communicated from the sensing device(s) 64, 264a-i to the control subsystem 18, 218 with or without preprocessing.

At step 340, at least one parameter may be extracted from the sensed dynamic hydraulic pressure. As used herein, dynamic hydraulic-pressure-related parameters may include, for example, acceleration, period, amplitude, frequency, wavelength, intensity, velocity, direction, and/or any other like parameters. The parameter(s) may be extracted in any suitable manner by any suitable device. For instance, the sensing devices 64, 264a-i may include standalone sensors that merely provide hydraulic pressure signals to the control subsystem 18, 218. Or, the sensing devices 64, 264a-i may include sensors with built-in pre-processing electronics that provide pre-processed signals to the control subsystem 18, 218, and/or sensors with built-in processing electronics that may carry out portions of the presently disclosed method and may output suitable warning signals to other vehicle systems.

Any of several well known techniques for conditioning or processing sensor readings and providing such conditioned or pre-processed output for further processing may be used. For example, the pressure signals may be filtered, amplified. conditioned, or the like. Any suitable preprocessing software and/or devices may be used to reduce signal size and extract signal contents, and processing may include Fast-Fourier Transforms (FFT), wavelet analysis, principle component analysis, or the like. Dynamic pressure readings may be digital or analog and may include discrete pressure readings sampled at a certain frequency over a certain period. For example, a dynamic pressure reading may be sampled at a rate of 1 kHz over a 1 second period to yield 1,000 discrete pressure measurements.

At step 350, at least one condition of a cooling subsystem may be diagnosed to provide a cooling subsystem diagnosis. The diagnosis may be carried out by any suitable analytical techniques. For example, the control subsystem 18, 218 may diagnose a condition by receiving parameter values extracted from the sensed pressure signals, executing instructions in light of such parameter values, and transmitting suitable output signals such as control signals, warning signals, or the like. Empirical models may be developed from suitable engine system testing or calibration and may include any construct that represents something using variables, such as lookup tables, maps, formulas, algorithms and/or the like that may be processed with the extracted parameters with or without other engine system parameter values to produce a diagnosis. Of course, models may be application specific and particular to the exact design and performance specifications of any given engine system.

In another example, artificial intelligence or neural networks may be used to evaluate results from the preprocessed data. Neural networks may be used to detect system status to which the networks have been previously trained. Neural networks may be trained to derive one or more pressure-related parameters from the sensed dynamic hydraulic pressure signals. More specifically, the network may be trained to produce given outputs for given inputs, and may include adaptive weighting of certain input based on experience. The network may be trained based on empirical engine system calibration of an engine in an instrumented vehicle on a dynamometer, or the like. After the neural network is trained, it may be implemented in the control subsystem 18, 218 to process input received from the sensing devices 64, 264*a-i* and other input devices and produce some desired output signals for example to control system devices or to issue warnings or alarms.

Steps 351 through 359 provide several specific examples of step 350 that may be used independently or in any combination with one another.

At step 351, one or more parameters associated with failure of a device in a cooling subsystem may be evaluated to diagnose or predict actual failure in the cooling subsystem. For example, the sensing device(s) 64, 264*a-i* may be located at or in sufficient proximity to any devices in the cooling subsystem 16, 216*a,b* that may be susceptible to failure to reliably detect certain signals or parameters generated by device failure. For instance, the sensing device(s) 64, 264*a-i* may be located near the pump 60, 260, thermostat valve 62, 262, or any other devices. As one example, the frequency domain of the pressure signal may be evaluated to determine whether the pump 60, 260 has failed in some way. This step may allow early detection of device failure, for example, before coolant temperature rises significantly and before conventional temperature sensors indicate a problem by way of a significant increase in temperature reading.

At step 352, one or more parameters associated with speed of a pump in a cooling subsystem may be evaluated to diagnose or estimate actual pump speed. For example, the sensing device(s) 64, 264*a-i* may include one or more hydraulic pressure sensors located at or in sufficient proximity to the pump 60, 260 to reliably detect hydraulic pressure signals generated by the pump 60, 260. In a particular example, the frequency domain of the pressure signals may be correlated to pump speed, such as during testing and calibration of the system 10, 210. This step may allow early detection of changes in pump speed, for example, before coolant temperature rises significantly and before conventional temperature sensors indicate a problem by way of a significant increase in temperature reading.

At step 353, one or more parameters associated with volume flow may be monitored to diagnose or assess actual volume flow through one or more portions of a cooling subsystem. For example, the sensing devices(s) 64, 264*a-i* may include a hydraulic pressure sensor placed in one or more locations of the cooling subsystem 16, 216*a*,b where it is desired to measure coolant volume flow, for example, at or near a restriction to detect turbulence "noise." In a particular example, certain noises corresponding to certain flow parameters can be processed with a model or trained into a neural network and, thereafter, noise can be monitored to estimate volume flow. Because volume flow through the cooling subsystem 16, 216*a,b* tends to exhibit repeatable noise characteristics, volume flow may be reliably estimated.

At step 354, one or more parameters associated with volume flow splits in a cooling subsystem may be evaluated to diagnose or assess whether volume flow splits are actually being carried out as intended. For example, two or more hydraulic pressure sensors may placed in proximity to one or more volume flow split locations of the cooling subsystem 16, 216*a,b* where it is desired to assess absence or presence, or quality, of coolant volume flow splits. For instance, the sensing devices 264*a*, 264*e*, 264*f* of FIG. 2 may be used in proximity to their respective branch flow splits. This step may be similar to that described in step 353. Because normal volume flow splits in the cooling subsystem 16, 216*a,b* tends to exhibit repeatable noise characteristics, volume flow splits may be reliably assessed.

At step 355, one or more parameters, for example coolant wave speed, associated with coolant temperature may be evaluated to diagnose or estimate actual coolant temperature in a cooling subsystem. For example, the sensing devices(s) 64, 264*a-i* may include one or more hydrophones and/or hydraulic pressure sensors in any location of the cooling subsystem 16, 216*a,b* where it is desired to estimate coolant temperature. In a particular example, the device(s) 64, 264*a-i* may be located in a side branch tube or Helmholtz resonator, wherein Eigenfrequency of such tube or resonator varies with changes in the speed of sound, which may be calibrated to temperature changes in the subsystem. Accordingly, the sensing device(s) 64, 264*a-i* may supplement or replace conventional coolant temperature sensors in cooling subsystems.

At step 356, one or more parameters associated with leakage of a cooling subsystem may be monitored to diagnose or predict actual leakage in the cooling subsystem. For example, the sensing clevice(s) 64, 264*a-i* may include hydraulic pressure sensors located at or in sufficient proximity to locations in the cooling subsystem 16, 216*a,b* that may be susceptible to leakage to reliably detect acoustic signals generated by actual leakage. In a particular example, piezoelectric sensors may be mounted to subsystem conduit or components on waveguides to transform acoustic waves to electronic voltage signals, which may be amplified, filtered, and processed to determine energy content emanating from sites of fluid leakage such as through orifices, cracks, and/or corrosion in a pressurized cooling sub-system. This step may allow early detection of leakage, for example, before coolant temperature rises significantly and before conventional temperature sensors indicate a problem by way of a significant increase in temperature reading.

At step 357, one or more parameters associated with localized boiling of coolant in a cooling subsystem may be monitored to diagnose or predict actual boiling in the cooling subsystem. For example, the sensing device(s) 64, 264*a-i* may include one or more hydraulic pressure sensors located at or in sufficient proximity to locations in the cooling subsystem 16, 216*a,b* that may be susceptible to localized boiling to reliably detect pressure signals generated by actual boiling. In a particular example, buildup and collapse of coolant bubbles cause certain acoustic footprints that may be sensed by the device(s) 64, 264*a-i* and identified by the control subsystem 18, 218. This step may allow early detection of localized boiling, for example, before coolant temperature rises significantly and before conventional temperature sensors indicate a problem by way of a significant increase in temperature reading.

At step 358, one or more parameters associated with a variably controlled valve of a cooling subsystem may be monitored to diagnose or assess position, opening or closing percentage, or the like of the valve. For example, the sensing device(s) 64, 264a-i may include one or more hydraulic pressure sensors located in proximity to a valve, such as valves 263a, 263b of FIG. 2. This step may be similar to step 353, wherein volume flow may be analyzed to assess whether a valve has been opened or not, as just one example.

At step 359, one or more parameters associated with cavitation in a cooling subsystem may be monitored to diagnose or predict actual cavitation in the cooling subsystem. For example, the sensing device(s) 64, 264a-i may include one or more hydraulic pressure sensors located at or in sufficient proximity to locations in the cooling subsystem 16, 216a,b that may be susceptible to cavitation to reliably detect pressure signals generated by actual cavitation. This step may allow early detection of cavitation, for example, before damage occurs and the coolant temperature rises significantly and before conventional temperature sensors indicate a problem by way of a significant increase in temperature reading.

At step 360, the method 300 may be terminated in any suitable manner. For example, the method 300 may be terminated at shutdown of the engine 12, 212 of the engine system 10, 210 of FIG. 1 or 2.

The method 300 may be used as input to any suitable control of a cooling subsystem or any other subsystem or portion of an engine system. In one example, the method 300 may be used to generate an input parameter for closed-loop control of variable pump speed. In another example, the method may be used to control flow of coolant through a controllable or active thermostat. Of course, control of variable pump speed or thermostat flow-through may also involve other parameters such as engine speed, load, vehicle speed, intake manifold temperature, and/or any other suitable parameters.

The method 300 or any portion thereof may be performed as part of a product such as the systems 10, 210 or subsystems 16, 216a,b of FIG. 1 or 2, and/or as part of a computer program that may be stored and/or executed by the control subsystems 18, 218. The computer program may exist in a variety of forms both active and inactive. For example, the computer program can exist as software program(s) comprised of program instructions in source code, object code, executable code or other formats; firmware program(s); or hardware description language (HDL) files. Any of the above may be embodied on a computer usable medium, which include storage devices and signals, in compressed or uncompressed form. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

At least portions of the presently disclosed method may be enabled by one or more computer programs and various engine system data or instructions stored in memory as look-up tables, formulas, algorithms, maps, models, or the like. In any case, the control subsystems 18, 218 may control engine system parameters by receiving input signals from the sensors, executing instructions or algorithms in light of sensor input signals, and transmitting suitable output signals to the various actuators.

The above description of embodiments of the invention is merely exemplary in nature and, thus, variations thereof are not to be regarded as a departure from the spirit and scope of the invention.

What is claimed is:

1. An engine system comprising:
   an internal combustion engine;
   an engine breathing system coupled to the engine, and including:
   an induction subsystem coupled to the engine upstream thereof;
   an exhaust subsystem coupled to the engine downstream thereof;
   a high-pressure (HP) exhaust gas recirculation (EGR) subsystem in communication across the exhaust and induction subsystems, and including a HP high-temperature (HT) EGR cooler;
   a turbocharger between the induction and exhaust subsystems and including a turbine in the exhaust subsystem and a compressor in the induction subsystem; and
   a low-pressure (LP) EGR subsystem in communication across the exhaust subsystem downstream of the turbine and upstream of the compressor, and including a LP HT EGR cooler;
   a cooling subsystem coupled to the engine to cool at least a portion of the engine and including:
   a plurality of hydraulic pressure sensing devices to sense dynamic hydraulic pressure; and
   a high-temperature (HT) cooling subsystem in fluid communication with the internal combustion engine and the engine breathing system, and including an HT radiator, an HT coolant pump, a thermostat valve, the HP and LP HT EGR coolers, an HT coolant valve;
   a LT cooling subsystem; and
   a control subsystem to extract a parameter from the sensed dynamic hydraulic pressure, and to evaluate the extracted parameter to diagnose a condition of the cooling subsystem;
   wherein said LT cooling subsystem is in fluid communication with the internal combustion engine and the engine breathing system, and includes an LT radiator, an LT coolant pump, an LP LT EGR cooler, an LT coolant valve, and said plurality of hydraulic pressure sensing devices.

2. The engine system of claim 1 wherein one of the plurality of hydraulic pressure sensing devices is located downstream of the HT coolant pump and upstream of the engine.

3. The engine system of claim 1 wherein one of the plurality of hydraulic pressure sensing devices is located downstream of the engine and upstream of the HT radiator.

4. The engine system of claim 3 wherein one of the plurality of sensing devices is proximate the HT coolant valve to monitor and diagnose operation of the HT coolant valve.

5. The engine system of claim 1 wherein one of the plurality of hydraulic pressure sensing devices is located downstream of the engine and upstream of the HT pump.

6. The engine system of claim 1 wherein one of the plurality of hydraulic pressure sensing devices is located downstream of the HT EGR cooler and upstream of the HT pump.

7. The engine system of claim 1 wherein one of the plurality of hydraulic pressure sensing devices is located downstream of the LT EGR cooler and upstream of the LT radiator.

8. The engine system of claim 7 wherein said one of the plurality of sensing devices is proximate a junction of HP and LP LT coolant branches to monitor and diagnose flow of coolant downstream of the LT EGR cooler.

9. The engine system of claim 1 wherein one of said plurality of hydraulic pressure sensing devices is located downstream of the LT radiator and upstream of the LT pump.

10. The engine system of claim 1 wherein the induction subsystem includes a charge air cooler (CAC), and one of said plurality of hydraulic pressure sensing devices is located downstream of the LT pump and upstream of the CAC.

11. The engine system of claim 10 wherein said one of said plurality of sensing devices is located just downstream of the LT pump to monitor and diagnose operation of the LT pump.

12. The engine system of claim 1 wherein the induction subsystem includes a charge air cooler (CAC), and one of said plurality of hydraulic pressure sensing devices is located downstream of both the CAC and the LP LT EGR cooler, and upstream of the LT radiator.

13. An engine system comprising:
an internal combustion engine;
an engine breathing system coupled to the engine, and including an induction subsystem coupled to the engine upstream thereof, and an exhaust subsystem coupled to the engine downstream thereof;
a high-pressure (HP) exhaust gas recirculation (EGR) subsystem in communication across the exhaust and induction subsystems, and including a HP high-temperature (HT) EGR cooler;
a turbocharger between the induction and exhaust subsystems and including a turbine in the exhaust subsystem and a compressor in the induction subsystem; and
a low-pressure (LP) EGR subsystem in communication across the exhaust subsystem downstream of the turbine and upstream of the compressor, and including a LP HT EGR cooler;
a cooling subsystem coupled to the engine to cool at least a portion of the engine and including:
a plurality of hydraulic pressure sensing devices to sense dynamic hydraulic pressure; and
a high-temperature (HT) cooling subsystem in fluid communication with the internal combustion engine and the engine breathing system, and including an HT radiator, an HT coolant pump, a thermostat valve, the HP and LP HT EGR coolers, an HT coolant valve;
a low-temperature (LT) cooling subsystem in fluid communication with the internal combustion engine and the engine breathing system, including an LT radiator, an LT coolant pump, an LP LT EGR cooler, and an LT coolant valve; and
a control subsystem to extract a parameter from the sensed dynamic hydraulic pressure, and to evaluate the extracted parameter to diagnose a condition of the cooling subsystem.

14. The engine system of claim 13 wherein one of said plurality of hydraulic pressure sensing devices is located downstream of the LT EGR cooler and upstream of the LT radiator.

15. The engine system of claim 14 wherein said sensing device is proximate a junction of HP and LP LT coolant branches to monitor and diagnose flow of coolant downstream of the LT EGR cooler.

16. The engine system of claim 13 wherein one of said plurality of hydraulic pressure sensing devices is located downstream of the LT radiator and upstream of the LT pump.

17. The engine system of claim 13 wherein said induction subsystem includes a charge air cooler (CAC), and one of said plurality of hydraulic pressure sensing devices is located downstream of the LT pump and upstream of the CAC.

18. The engine system of claim 17 wherein said sensing device is located just downstream of said LT pump to monitor and diagnose operation of said LT pump.

19. An engine system comprising:
an internal combustion engine;
an engine breathing system coupled to the engine, and including:
an induction subsystem coupled to the engine upstream thereof;
an exhaust subsystem coupled to the engine downstream thereof;
a high-pressure (HP) exhaust gas recirculation (EGR) subsystem in communication across the exhaust and induction subsystems, and including a HP high-temperature (HT) EGR cooler;
a turbocharger between the induction and exhaust subsystems and including a turbine in the exhaust subsystem and a compressor in the induction subsystem; and
a low-temperature (LP) EGR subsystem in communication across the exhaust subsystem downstream of the turbine and upstream of the compressor, and including a LP HT EGR cooler;
a cooling subsystem coupled to the engine to cool at least a portion of the engine and including:
a plurality of hydraulic pressure sensing devices to sense dynamic hydraulic pressure; and
a high-temperature (HT) cooling subsystem in fluid communication with the internal combustion engine and the engine breathing system, and including an HT radiator, an HT coolant pump, a thermostat valve, the HP and LP HT EGR coolers, an HT coolant valve;
a low-temperature (LT) cooling subsystem in fluid communication with the internal combustion engine and the engine breathing system, and including an LT radiator, an LT coolant pump, an LP LT EGR cooler, and an LT coolant valve;
a control subsystem to extract a parameter from the sensed dynamic hydraulic pressure, and to evaluate the extracted parameter to diagnose a condition of the cooling subsystem; and
said induction subsystem includes a charge air cooler (CAC), and wherein one of said plurality of hydraulic pressure sensing devices being located downstream of both the CAC and the LP LT EGR cooler, and upstream of the LT radiator.

20. The engine system of claim 19 wherein one of said plurality of hydraulic pressure sensing devices is located downstream of the HT coolant pump and upstream of the engine.

21. The engine system of claim 19 wherein one of said plurality of hydraulic pressure sensing devices is located downstream of the engine and upstream of the HT radiator.

22. The engine system of claim 19 wherein one of said plurality of sensing devices is proximate the HT coolant valve to monitor and diagnose operation of the HT coolant valve.

23. The engine system of claim 19 wherein one of said plurality of hydraulic pressure sensing devices is located downstream of the engine and upstream of the HT pump.

24. The engine system of claim 19 wherein one of said plurality of hydraulic pressure sensing devices is located downstream of the EGR cooler and upstream of the HT pump.

25. The engine system of claim 19 wherein one of said plurality of hydraulic pressure sensing devices is located downstream of the LT EGR cooler and upstream of the LT radiator.

26. The engine system of claim 25 wherein said one of said plurality of sensing devices is proximate a junction of HP and LP LT coolant branches to monitor and diagnose flow of coolant downstream of the LT EGR cooler.

27. The engine system of claim 19 wherein one of said plurality of hydraulic pressure sensing devices is located downstream of the LT radiator and upstream of the LT pump.

28. The engine system of claim 19 wherein one of said plurality of hydraulic pressure sensing devices is located downstream of the LT pump and upstream of the CAC.

29. The engine system of claim 28 wherein said sensing device is located just downstream of the LT pump to monitor and diagnose operation of the pump.

30. The engine system of clutch 19 wherein the extracted parameter is at least one of acceleration, period, amplitude, frequency, wavelength, intensity, velocity, or direction.

31. The engine system of claim 19 wherein at least one of said conditions include at least one of a device malfunction, device failure, device position, coolant leakage, coolant boiling, coolant volume flow, coolant volume flow splits, coolant pressure differential, or coolant temperature.

\* \* \* \* \*